(12) United States Patent
Kim

(10) Patent No.: US 11,799,872 B2
(45) Date of Patent: Oct. 24, 2023

(54) VERIFICATION LEVEL CONTROL METHOD, AND SERVER USING THE SAME

(71) Applicant: OPENIT INC., Seoul (KR)

(72) Inventor: Min Young Kim, Seoul (KR)

(73) Assignee: OPENIT INC., Seoul (KR)

( * ) Notice: Subject to any disclaimer, the term of this patent is extended or adjusted under 35 U.S.C. 154(b) by 32 days.

(21) Appl. No.: 17/970,173

(22) Filed: Oct. 20, 2022

(65) Prior Publication Data
US 2023/0126402 A1 Apr. 27, 2023

(30) Foreign Application Priority Data
Oct. 21, 2021 (KR) .......... 10-2021-0141322

(51) Int. Cl.
*H04L 9/40* (2022.01)

(52) U.S. Cl.
CPC .......... *H04L 63/107* (2013.01); *H04L 63/0861* (2013.01); *H04L 63/20* (2013.01)

(58) Field of Classification Search
CPC ..... H04L 63/107; H04L 63/0861; H04L 63/20
USPC .......................................................... 726/1
See application file for complete search history.

(56) References Cited

U.S. PATENT DOCUMENTS

| | | | | |
|---|---|---|---|---|
| 11,503,101 | B1* | 11/2022 | Russo et al. | H04L 65/612 |
| 2001/0022558 | A1* | 9/2001 | Karr, Jr. et al. | G01S 5/0278 |
| | | | | 342/450 |
| 2009/0146817 | A1* | 6/2009 | Ikeda | G08B 21/22 |
| | | | | 340/572.1 |
| 2011/0111698 | A1* | 5/2011 | Odakura | H04M 1/72412 |
| | | | | 455/41.2 |
| 2014/0325209 | A1* | 10/2014 | Koster et al. | H04L 63/0823 |
| | | | | 726/10 |
| 2016/0344736 | A1* | 11/2016 | Khait et al. | H04L 63/102 |
| 2022/0269851 | A1* | 8/2022 | DeNeui et al. | G06F 21/6218 |

FOREIGN PATENT DOCUMENTS

| KR | 10-1395675 | B1 | 5/2014 |
|---|---|---|---|
| KR | 10-2017-0060552 | A | 6/2017 |

OTHER PUBLICATIONS

Request for the Submission of an Opinion of Korean Application No. 10-2021-0141322 dated Jan. 19, 2022.
Written Decision on Registration of Korean Application No. 10-2021-0141322 dated Apr. 19, 2022.

* cited by examiner

*Primary Examiner* — Amare F Tabor
*Assistant Examiner* — Aubrey H Wyszynski
(74) *Attorney, Agent, or Firm* — Sughrue Mion, PLLC

(57) ABSTRACT

Provided is a verification level control method, the method comprises checking a history of verification or a history of re-authentication of a verification target, setting an abnormal suspicious area according to a change in frequency of access to a partial area within an access permission area of the verification target, based on the checked verification history or re-authentication history and verifying the verification target by reflecting whether the verification target is located in the set abnormal suspicious area, wherein the re-authentication is performed in an explicit authentication method in which the verification target needs to perform a separate action for the re-authentication.

13 Claims, 6 Drawing Sheets

VERIFICATION LEVEL CONTROL METHOD, AND SERVER USING THE SAME

CROSS-REFERENCE TO RELATED APPLICATIONS

This application claims the benefits of Korean Patent Applications No. 10-2021-0141322, filed on Oct. 21, 2021, in the Korean Intellectual Property Office, the disclosures of which are incorporated herein in their entireties by reference.

BACKGROUND

1. Field

The present disclosure relates to a verification level control method, and a server using the same, and more particularly, to a verification level control method capable of performing verification by setting an abnormal suspicious area according to a change in the frequency of access to a partial area within an access permission area of a verification target based on a history of verification or a history of re-authentication, and a server using the same.

2. Description of the Related Art

Biometric authentication is a technology that verifies the identity of a person using physical or behavioral characteristics and grants the person access to devices, services, or spaces with restricted access rights. Biometric data such as fingerprint, face, or voice is mainly used for biometric authentication and a characteristic or pattern unique to each person in the biometric data is utilized for biometric authentication.

However, there is a case where continuous authentication and verification management are required even for users who have completed biometric authentication, and in this case, performing biometric authentication again significantly reduces the economic efficiency or user convenience of facility construction.

SUMMARY

Provided are methods of controlling verification level capable of performing verification by setting an abnormal suspicious area according to a change in the frequency of access to a partial area within an access permission area of a verification target based on a history of verification or a history of re-authentication, and servers using the same.

According to an aspect of an embodiment, a verification level control method may comprise checking a history of verification or a history of re-authentication of a verification target, setting an abnormal suspicious area according to a change in frequency of access to a partial area within an access permission area of the verification target, based on the checked verification history or re-authentication history and verifying the verification target by reflecting whether the verification target is located in the set abnormal suspicious area, wherein the re-authentication is performed in an explicit authentication method in which the verification target needs to perform a separate action for the re-authentication.

According to an aspect of an embodiment, the setting of the abnormal suspicious area may comprise setting a range of the abnormal suspicious area differently according to the number of verifications or re-authentications, based on the history of verification or the history of re-authentication.

According to an aspect of an embodiment, the verification may comprise first verification determining whether an abnormal situation occurs in the verification target and second verification performing an additional verification process for the abnormal situation when an abnormal situation occurs according to a result of the first verification.

According to an aspect of an embodiment, the abnormal situation may comprise at least one of a case in which authentication authority granted to the verification target in an initial authentication process has expired, a case in which a situation of the verification target is out of the scope of the granted authentication authority, a case in which a problem occurs in an operation of a portable terminal authenticated by the verification target during the initial authentication process, and a case in which the portable terminal is used by someone other than the verification target.

According to an aspect of an embodiment, the setting of the abnormal suspicious area may be performed when the abnormal situation occurs according to a result of the first verification.

According to an aspect of an embodiment, the setting of the abnormal suspicious area may comprise setting a range of the abnormal suspicious area differently according to a type of the abnormal situation that occurs according to the result of the first verification.

According to an aspect of an embodiment, the setting of the abnormal suspicious area may comprise setting a range of the abnormal suspicious area differently according to severity of the abnormal situation that occurs according to the result of the first verification.

According to an aspect of an embodiment, the severity of the abnormal situation may be preset according to a type of the abnormal situation.

According to an aspect of an embodiment, a case in which the verification target may be located in a non-accessible area and a case in which the verification target is located in the abnormal suspicious area are set as different types of abnormal situations or different severities of abnormal situations.

According to an aspect of an embodiment, the notification may be performed within different notification target ranges respectively when the verification target is located in the non-accessible area and when the verification target is located in the abnormal suspicious area.

According to an aspect of an embodiment, the setting of the abnormal suspicious area may comprise setting a range of the abnormal suspicious area differentially when the second verification is successful and when the second verification fails, according to a result of the second verification.

According to an aspect of an embodiment, the setting of the abnormal suspicious area may be performed by considering changes in frequency of access to the partial area of the verification target and a companion of the verification target.

According to an aspect of an embodiment, a verification server may comprise a verification level controller configured to check a history of verification or a history of re-authentication of a verification target, and set an abnormal suspicious area according to a change in frequency of access to a partial area within an access permission area of the verification target, based on the checked verification history or re-authentication history and a verifier configured to verify the verification target by reflecting whether the verification target is located in the set abnormal suspicious area, wherein the re-authentication is performed in an explicit authentication method in which the verification target needs to perform a separate action for the re-authentication.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
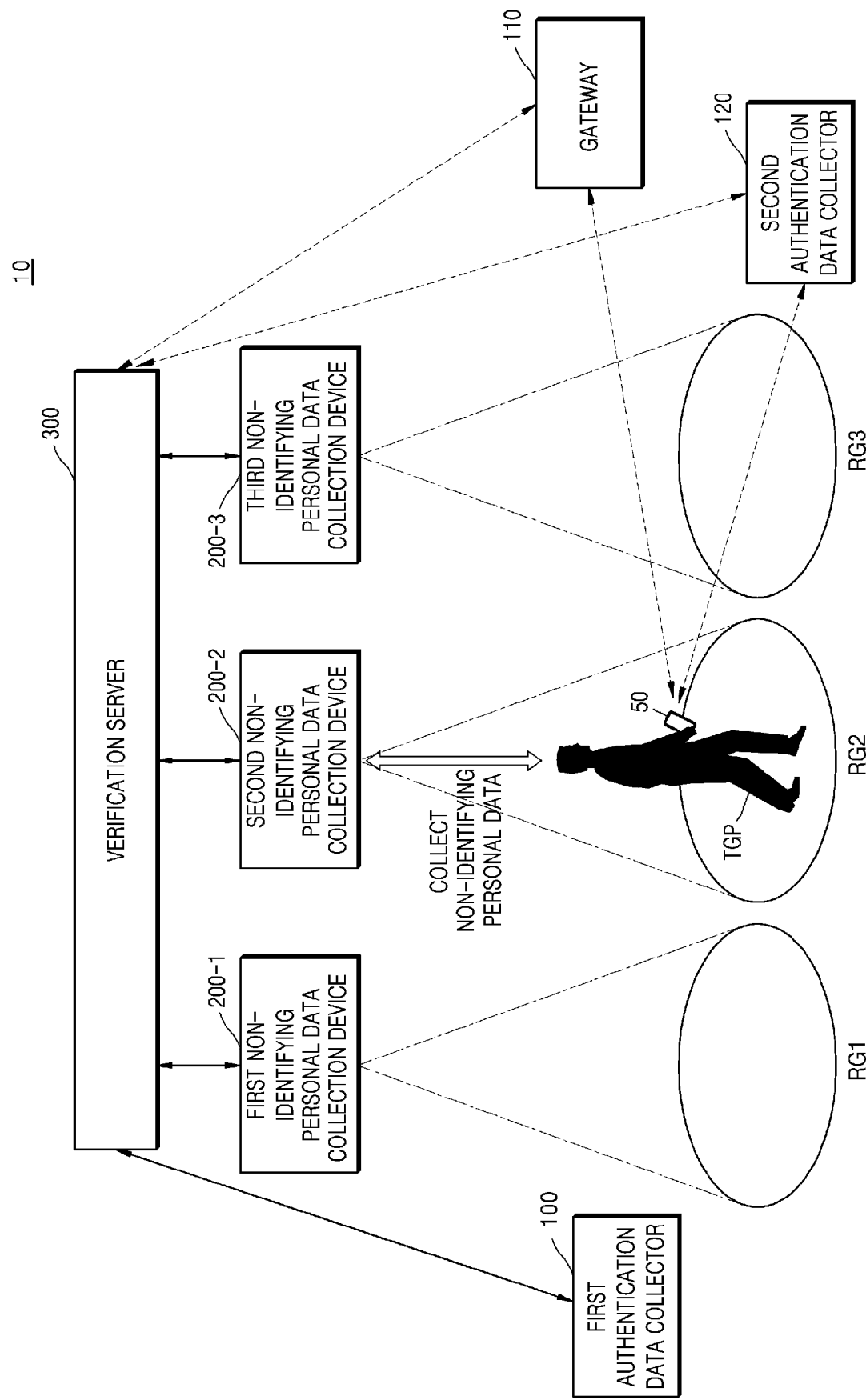
FIG. 1 is a conceptual diagram of an authentication/verification system according to an embodiment.

The inventive concept may be variously modified and have various embodiments, so that specific embodiments will be illustrated in the drawings and described in the detailed description. However, this does not limit the inventive concept to specific embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the present disclosure. In addition, numeral figures (e.g., 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Figure 2:
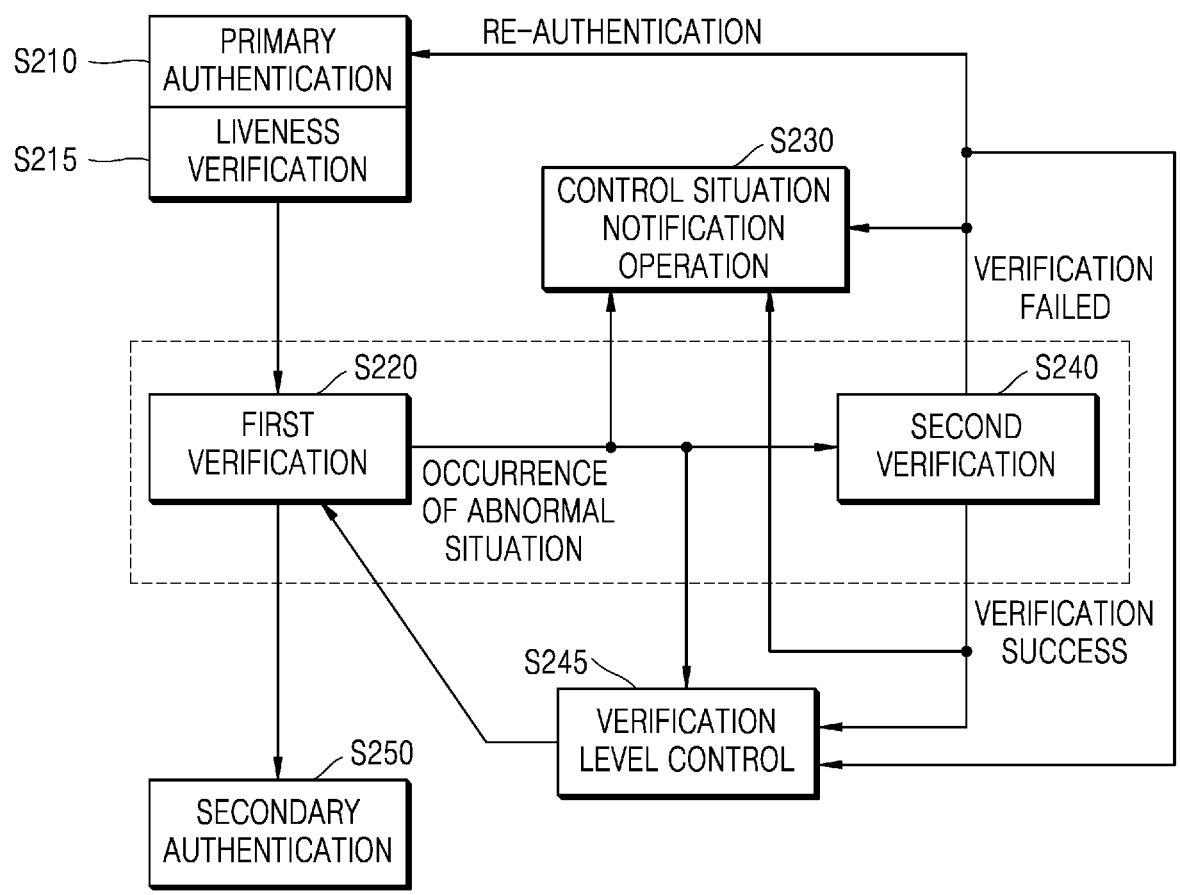
FIG. 2 is a conceptual diagram of an authentication and verification structure including a verification level control process, according to an embodiment.
Figure 3:
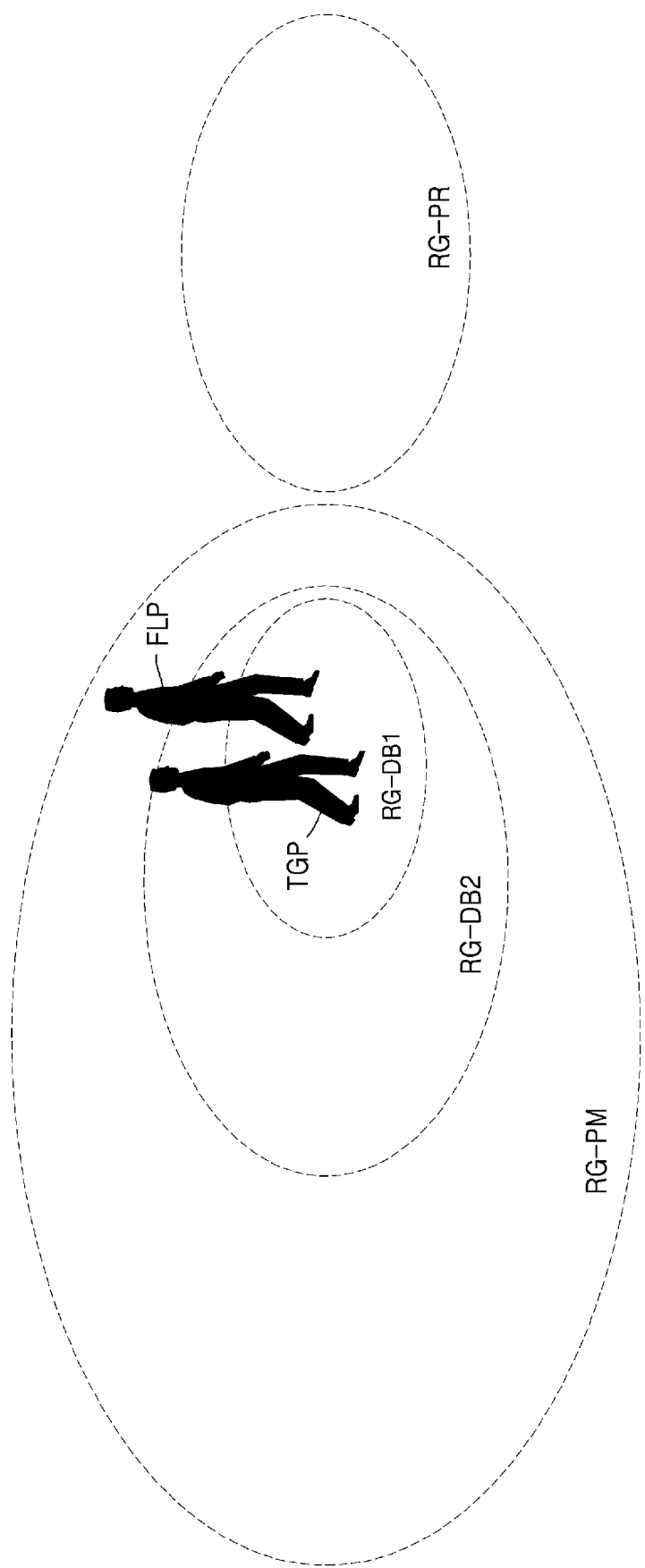
FIG. 3 is a conceptual diagram illustrating an example in which an abnormal suspicious area is set in an authentication/verification system of the disclosure.

FIG. 1 is a conceptual diagram of an authentication/verification system according to an embodiment. FIG. 2 is a conceptual diagram of an authentication and verification structure including a verification level control process, according to an embodiment. FIG. 3 is a conceptual diagram illustrating an example in which an abnormal suspicious area is set in an authentication/verification system of the disclosure.

Referring to FIG. 1, an authentication/verification system 10 according to an embodiment may include a first authentication data collector 100, a gateway 110, a second authentication data collector 120, a plurality of non-identifying personal data collection devices 200-1 to 200-3, and a verification server 300.

In this specification, the terms of "authentication" and "verification" are used separately depending on the level of checking a verification target. However, in some cases, both "authentication" and "verification" may be used with the same meaning in that both are procedures for identifying a verification target, and in this case, the two terms may be used interchangeably. A verification target TGP of FIG. 1 may be both a verification target and an authentication target, and the verification server 300 of FIG. 1 may perform both a verification process and an authentication process.

Referring to FIGS. 1 and 2 together, the authentication/verification system 10 may include a two-step authentication procedure consisting of primary authentication operation (S210) and secondary authentication operation (S250).

According to an embodiment, operations S210 to S250 may be performed by the verification server 300.

According to an embodiment, the primary authentication operation (S210) is performed when the verification target TGP first enters access-restricted facilities (or when initially accessing access-restricted services), and the secondary authentication operation (S250) may be performed when the verification target TGP enters a space requiring a separate authentication procedure in the access-restricted facilities or when using a service requiring additional authentication in the access-restricted facilities (or when accessing services with additional access restrictions from among the access-restricted services). In addition, various modifications are possible for examples in which the primary authentication operation (S210) and the secondary authentication operation (S250) are used.

Authentication data to be used in the primary authentication operation (S210) may be collected by the first authentication data collector 100 and transmitted to the verification server 300.

According to an embodiment, the primary authentication operation (S210) may be performed in an explicit authentication method in which the verification target TGP needs to perform a separate action for authentication.

According to an embodiment, the primary authentication operation (S210) may be performed in a biometric authentication method.

According to an embodiment, when the primary authentication operation (S210) is performed in the biometric authentication method, liveness verification operation (S215) for checking whether biometric data collected for biometric authentication is not due to biometric mimicking may be further included.

According to an embodiment, in the primary authentication operation (S210), at least two of biometric information of the verification target TGP, identification information (e.g., ID) of the verification target TGP, and identification information (e.g., a Media Access Control (MAC) address, International Mobile Equipment Identity (IMEI), etc.) of a portable terminal 50 possessed by the verification target TGP may be mapped to each other and stored in the verification server 300.

Authentication data to be used in the secondary authentication operation (S250) may be collected by the second authentication data collector 120 and transmitted to the verification server 300.

According to an embodiment, the secondary authentication operation (S250) may be performed in an insensitive authentication method that does not require the verification target TGP to perform a separate action for authentication.

According to an embodiment, the secondary authentication operation (S250) may be performed in the form of authenticating the portable terminal 50 through identification information (e.g., an MAC address, IMEI, etc.) of the portable terminal 50 possessed by the verification target TGP.

According to another embodiment, in the secondary authentication operation (S250), authentication may be performed using a behavior pattern of the verification target TGP based on sensing data collected through the portable terminal 50 possessed by the verification target TGP.

According to another embodiment, the secondary authentication operation (S250) may be performed by collecting an image of the verification target TGP, and using biometric information or a behavior pattern of the verification target TGP determined from the collected image.

Between the primary authentication operation (S210) and the secondary authentication operation (S250), first verification operation (S220) of continuously or periodically determining whether an abnormal situation occurs in the verification target TGP or the portable terminal 50 possessed by the verification target TGP may be performed, and when an abnormal situation occurs, second verification operation (S240) including an additional verification process may be performed.

According to an embodiment, both the first verification operation (S220) and the second verification operation (S240) may be included in the verification process, and may be performed as one verification process.

The abnormal situation may broadly mean a case in which a problem occurs in the operation of the portable terminal 50 that the verification target TGP initially possesses in the primary authentication operation (S210), and thus there is a failure in the secondary authentication operation (S250) using the portable terminal 50, or a case in which the portable terminal 50 may be possessed and abused by someone other than the verification target TGP.

According to an embodiment, the abnormal situation may correspond to a case in which authentication authority granted to the verification target TGP in the process of the primary authentication operation (S210) has expired, or a situation (e.g. location or time) of the verification target TGP is out of the scope of the granted authentication authority.

When the verification fails in the second verification operation (S240), the verification target TGP may return to the primary authentication operation (S210). In this case, the verification target TGP needs to perform the primary authentication operation (S210) again, and needs to succeed in authentication in the primary authentication operation (S210) to be able to enter the access-restricted facilities (or the access-restricted services) again.

When the verification is successful in the second verification operation (S240), the verification target TGP may return to the first verification operation (S220). In this case, the verification target TGP does not need to perform the primary authentication operation (S210) again.

According to an embodiment, when it is determined that an abnormal situation occurs in the first verification operation (S220), when the verification is successful in the second verification operation (S240), or when the verification fails in the second verification operation (S240) (in a case of re-authentication through the primary authentication operation (S210)), verification level control operation (S245) for the first verification operation (S220) may be performed.

That is, the verification level control operation (S245) may be performed based on a history of verification or a history of re-authentication of the verification target TGP.

In the verification level control operation (S245), based on the history of verification or the history of re-authentication, a verification level may be controlled according to a change in the frequency of access to a partial area within an access permission area of the verification target TGP (e.g., an abnormal suspicious area is set for a partial area within the access permission area of the verification target TGP).

According to an embodiment, histories that the verification target TGP moves within the access permission area may be stored in the verification server 300, and a partial area in which a change in access frequency is equal to or greater than a reference value may be set as an abnormal suspicious area. For example, if the verification target TGP is a non-smoker and the frequency of access to a partial area (e.g., a smoking area) within the access permission area is 0, but the frequency of access to the partial area suddenly increases to more than a reference value, the partial area (e.g., a smoking area) may be set as an abnormal suspicious area.

That is, when it is determined that an abnormal situation occurs in the first verification operation (S220), when the verification is successful in the second verification operation (S240), or when the verification fails in the second verification operation (S240), a change in the frequency of access to a partial area within the access permission area may be checked, and the partial area in which the change in the frequency of access is equal to or greater than a reference value may be set as an abnormal suspicious area.

Referring to FIGS. 2 and 3 together, in the access-restricted facilities (or access-restricted services), an access permission area RG-PM to which the verification target TGP is permitted to access and a non-accessible area RG-PR to which the verification target TGP is not permitted to access may be managed separately.

The verification server 300 may determine a normal situation when the verification target TGP is located in the access permission area RG-PM, and may determine an abnormal situation when the verification target TGP is located in the non-accessible area RG-PR.

When a verification level is adjusted (e.g., adjusted upward) according to the verification level control operation (S245), the verification server 300 may set an abnormal suspicious area RG-DB1 or RG-DB2 for a partial area within the access permission area RG-PM.

According to an embodiment, the verification server 300 may differentially set a range of the abnormal suspicious area RG-DB1 or RG-DB2 according to the number of verifications or re-authentications based on the history of verification or the history of re-authentication in the verification level control operation (S245). For example, the verification server 300 may check a change in the frequency of access to a partial area within the access permission area RG-PM of the verification target TGP when there is the history of verification or the history of re-authentication, and when there is a partial area where the frequency of access has increased by more than a reference value, may set an area within a certain range based on the partial area as an abnormal suspicious area. In this case, the verification server 300 may set an abnormal suspicious area for a relatively narrow area (e.g., the first abnormal suspicious area RG-DB1) when the number of verifications or re-authentications is relatively small (e.g., below a reference value), and may set an abnormal suspicious area for a relatively wide area (e.g., the second abnormal suspicious area RG-DB2) when the number of verifications or re-authentications is relatively large (e.g. exceeding a reference value).

According to another embodiment, in the verification level control operation (S245), the verification server 300 may differentially set a range of the abnormal suspicious area (e.g., RG-DB1 or RG-DB2) according to the type of the abnormal situation.

According to another embodiment, in the verification level control operation (S245), the verification server 300 may differentially set a range of the abnormal suspicious area (e.g., RG-DB1 or RG-DB2) according to the severity of the abnormal situation. For example, the verification server 300 may set an abnormal suspicious area for a relatively wide area (e.g., the second abnormal suspicious area RG-DB2) when the severity of the abnormal situation is relatively high, and may set an abnormal suspicious area for a relatively narrow area (e.g., the first abnormal suspicious area RG-DB1) when the severity of the abnormal situation is relatively low. For example, the severity of the abnormal situation may be preset according to the type of the abnormal situation.

According to another embodiment, in the verification level control operation (S245), based on the history of verification or the history of re-authentication, the verification server 300 may differentially set a range of the abnormal suspicious area (e.g., RG-DB1 or RG-DB2) when verification is successful and when verification fails according to a result of the second verification operation (S240). For example, the verification server 300 may set an abnormal suspicious area for a relatively narrow area (e.g., the first abnormal suspicious area RG-DB1) when verification is successful according to the result of the second verification operation (S240), and may set an abnormal suspicious area for a relatively wide area (e.g., the second abnormal suspicious area RG-DB2) when verification fails according to the result of the second verification operation (S240) (i.e., when re-authentication is performed).

In the verification level control operation (S245), the verification server 300 may set an abnormal suspicious area by considering changes in the frequency of access to a partial area of the verification target TGP and a companion FLP of the verification target TGP. For example, when a change in the frequency of access to a partial area of the verification target TGP is greater than a reference value but a change in the frequency of access to the partial area of the companion FLP is less than a reference value, the partial area may not be set as an abnormal suspicious area.

According to an embodiment, in the verification level control operation (S245), when a distance between the verification target TGP and an adjacent person is maintained within a reference range for a reference time, or when the similarity of movements of the verification target TGP and an adjacent person during a reference time is greater than or equal to a reference value, the verification server 300 may determine the adjacent person as the companion FLP of the verification target TGP.

When an abnormal situation occurs in the first verification operation (S220), or when the verification fails or the verification is successful in the second verification operation (S240), the verification server 300 may perform control situation notification operation (S230) for the corresponding situation. In this case, at least one of the fact that an abnormal situation occurs, the type of abnormal situation, the location where an abnormal situation occurs, identification information of a portable terminal in which an abnormal situation occurs, and identification information of a verification target having the portable terminal may be transmitted in the form of a notification to a central control room (not shown) that manages the authentication/verification system 10.

According to an embodiment, in the control situation notification operation (S230), the verification server 300 may set a case in which the verification target TGP is located in the non-accessible area RG-PR and a case in which the verification target TGP is located in the abnormal suspicious area RG-DB1 or RG-DB2 as different types of abnormal situations or different severities of abnormal situations. For example, the verification server 300 may set the case in which the verification target TGP is located in the non-accessible area RG-PR as being in an abnormal situation of relatively higher severity than the case in which the verification target TGP is located in the abnormal suspicious area RG-DB1 or RG-DB2.

According to an embodiment, the verification server 300 may perform notification within different notification target ranges when the verification target TGP is located in the non-accessible area RG-PR and when the verification target TGP is located in the abnormal suspicious area RG-DB1 or RG-DB2. For example, when the verification target TGP is located in the non-accessible area RG-PR, the verification server 300 may notify more notification targets than when the verification target TGP is located in the abnormal suspicious area RG-DB1 or RG-DB2. For example, when the verification target TGP is located in the non-accessible area RG-PR, the verification server 300 may notify a central manager and a field manager of an abnormal situation, and when the verification target TGP is located in the abnormal suspicious area RG-DB1 or RG-DB2, the verification server 300 may notify only a central manager of an abnormal situation.

Returning to FIG. 1, the verification target TGP may carry the portable terminal 50 and access a space (or service) managed by the authentication/verification system 10.

The portable terminal 50 is portable by the verification target TGP, and may broadly mean a terminal capable of wireless communication.

According to an embodiment, the portable terminal 50 may be implemented as a wearable device that can be carried in a form worn by the verification target TGP.

According to an embodiment, the portable terminal 50 may collect location data and motion sensing data of the verification target TGP.

According to another embodiment, when the portable terminal 50 is implemented as a wearable device, the portable terminal 50 may include a sensing device capable of sensing a state of contact with the verification target TGP.

According to an embodiment, the portable terminal 50 may be implemented as a beacon and transmit a Bluetooth signal to the gateway 110 located in the authentication/verification system 10, and location data of the portable terminal 50 may be collected through the location of at least one gateway that receives the Bluetooth signal transmitted from the portable terminal 50.

According to an embodiment, the portable terminal 50 may include a sensor for collecting motion-sensing data (e.g., accelerometer, gyro sensor, etc.).

The first authentication data collector 100 may collect authentication data to be used for authentication in the primary authentication operation (S210) from the verification target TGP and transmit the authentication data to the verification server 300.

According to an embodiment, when the primary authentication operation (S210) is performed by biometric authentication, the first authentication data collector 100 may collect biometric data (e.g., face, iris, retina, voice, fingerprint, hand shape, vein, handwriting, etc.) from the verification target TGP and transmit the collected biometric data to the verification server 300.

According to an embodiment, the first authentication data collector 100 may collect identification information of the portable terminal 50 possessed by the verification target TGP, identification information (e.g., ID) of the verification target TGP, and the like, in addition to the authentication data to be used for authentication in the primary authentication operation (S210).

The verification server 300 may perform the primary authentication operation (S210) using authentication data transmitted from the first authentication data collector 100.

The gateway 110 may periodically collect location data (it may be a Bluetooth signal when the portable terminal 50 uses beacon-type positioning) and motion-sensing data from the portable terminal 50 of the verification target TGP who has completed the primary authentication operation (S210). Although FIG. 1 illustrates a case in which one gateway 110 receives location data from the portable terminal 50 for convenience of explanation, a plurality of gateways may obtain location information of the portable terminal 50 by receiving location data (it may be a Bluetooth signal when the portable terminal 50 uses beacon-type positioning) from the portable terminal 50.

The gateway 110 may transmit the location data and the motion sensing data received from the portable terminal 50 to the verification server 300. The verification server 300 may determine whether an abnormal situation occurs and the type of abnormal situation based on the received location data and motion sensing data.

By performing the first verification operation (S220) by the verification server 300, when it is determined that an abnormal situation occurs, the second verification operation (S240) may be performed.

The verification server 300 may collect non-identifying personal data of the verification target TGP through the non-identifying personal data collection device 200-2 that monitors an area (e.g., RG2) where the portable terminal 50 in which an abnormal situation occurs is located.

Each of the plurality of non-identifying personal data collection devices 200-1 to 200-3 may collect non-identifying personal data continuously, periodically, or on an event basis from the verification target TGP who has completed the primary authentication operation (S210). For example, in a case of collecting non-identifying personal data based on an event, when an abnormal situation occurs, under the control of the verification server 300, only a non-identifying personal data collection device that monitors an area where the portable terminal 50, which is determined to be in an abnormal situation, is located, may selectively operate.

As used herein, the term "non-identifying personal data" may refer to data that cannot directly identify an authentication target (verification target), but indicates personal characteristics of the authentication target (verification target).

According to an embodiment, the non-identifying personal data may include at least one of the type of clothes, the color of clothes, the hairstyle, the beard shape, the type of accessories being worn, and whether or not glasses are worn of the authentication target (verification target).

According to an embodiment, each of the plurality of non-identifying personal data collection devices 200-1 to 200-3 may monitor areas RG1 to RG3 respectively allocated to the plurality of non-identifying personal data collection devices 200-1 to 200-3.

For example, when the verification target TGP in which an abnormal situation occurs is in the first area RG1, the first non-identifying personal data collection device 200-1 may collect non-identifying personal data of the verification target TGP, when the verification target TGP in which an abnormal situation occurs is in the second area RG2, the second non-identifying personal data collection device 200-2 may collect non-identifying personal data of the verification target TGP, and when the verification target TGP in which an abnormal situation occurs is in the third area RG3, the third non-identifying personal data collection device 200-3 may collect non-identifying personal data of the verification target TGP.

According to an embodiment, each of the plurality of non-identifying personal data collection devices 200-1 to 200-3 may directly extract non-identifying personal data from a video (or image) collected from the verification target TGP and then transmit the extracted non-identifying personal data to the verification server 300.

According to another embodiment, each of the plurality of non-identifying personal data collection devices 200-1 to 200-3 may transmit the video (or image) collected from the verification target TGP to the verification server 300, and the verification server 300 may extract non-identifying personal data from the received video (or image).

A detailed configuration and operation of each of the plurality of non-identifying personal data collection devices 200-1 to 200-3 will be described later with reference to FIG. 3.

The verification server 300 may perform a verification process using non-identifying personal data collected by at least one of the plurality of non-identifying personal data collection devices 200-1 to 200-3.

Detailed configuration and operation of the verification server 300 will be described later with reference to FIG. 5.

FIG. 1 shows three non-identifying personal data collection devices 200-1 to 200-3 for convenience of explanation, but the number of non-identifying personal data collection devices may vary, and a plurality of gateways 110 may also be configured for each space in the authentication/verification system 10 according to the communication coverage of the portable terminal 50.

Figure 4:
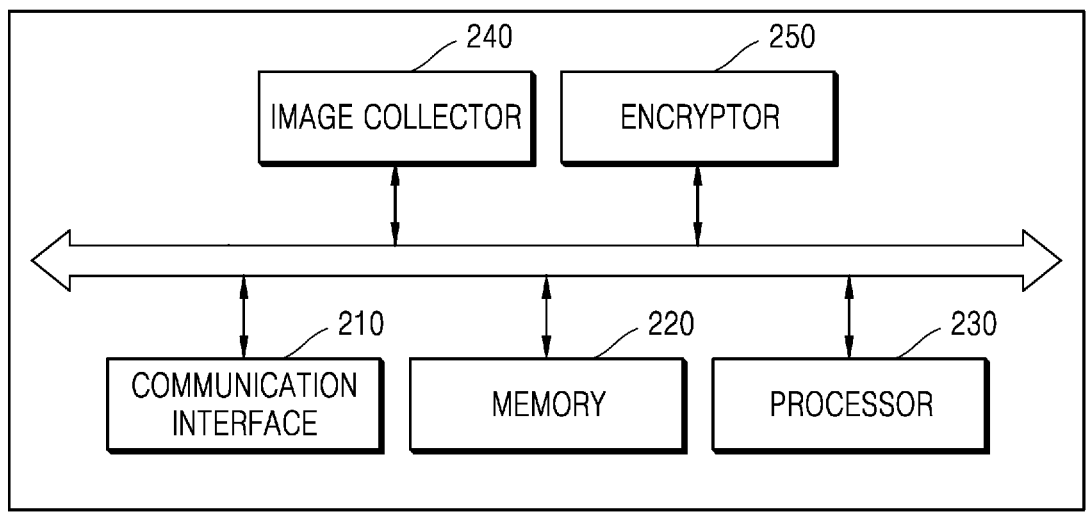
FIG. 4 is a block diagram of a non-identifying personal data collection device shown in FIG. 1, according to an embodiment.

FIG. 4 is a block diagram of a non-identifying personal data collection device shown in FIG. 1, according to an embodiment.

Referring to FIGS. 1 to 4, FIG. 4 shows a block diagram of any one (200-1) of the plurality of non-identifying personal data collection devices 200-1 to 200-3 for convenience of explanation, but the other non-identifying personal data collection devices 200-2 and 200-3 may also include the same configuration and operate in the same manner.

The non-identifying personal data collection device 200-1 may include a communication interface 210, a memory 220, a processor 230, an image collector 240, and an encryptor 250.

The communication interface 210 may interface communication between the verification server 300 and the non-identifying personal data collection device 200-1, and may process data or signals transmitted/received during the interfacing process.

The memory 220 may temporarily or permanently store data required to process the processor 230, data generated during or after the processing of the processor 230, or data collected by the image collector 240.

The processor 230 may perform general operations and data processing performed in the non-identifying personal data collection device 100.

According to an embodiment, the processor 230 may include the encryptor 250 in the form of a module.

The image collector 240 may collect a video (or image) of an area (e.g., RG1) covered by a corresponding non-identifying personal data collection device (e.g., 200-1).

The encryptor 250 may encrypt the video (or image) collected by the image collector 240 and manage the encrypted video (or image).

According to an embodiment, the encryptor 250 may encrypt biometric information in various methods such as a public key cryptography method (e.g., Fast Identity Online (FIDO) standard), and the technical scope of the disclosure is not limited by the encryption method of the encryptor 250.

According to an embodiment, when non-identifying personal data is extracted from the non-identifying personal data collection device 200-1, a configuration for extracting non-identifying personal data may be further included. At this time, the non-identifying personal data collection device 200-1 may extract non-identifying personal data by removing a portion that allows a specific person to be directly identified from the video or image collected by the image collector 240 or by processing a special effect (e.g., blur, mosaic processing, etc.) on the portion that allows a specific person to be directly identified.

Figure 5:
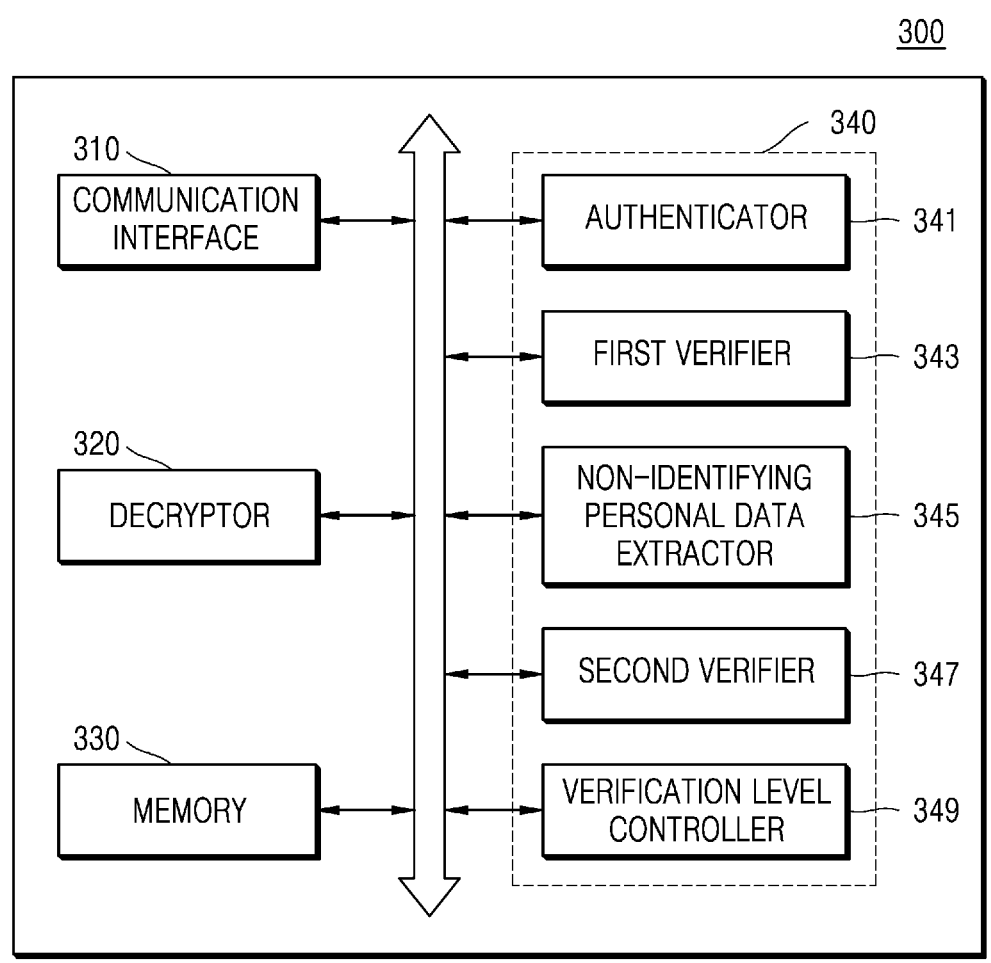
FIG. 5 is a block diagram of a verification server shown in FIG. 1 according to an embodiment.

FIG. 5 is a block diagram of a verification server shown in FIG. 1 according to an embodiment.

Referring to FIGS. 1 to 5, the verification server 300 may include a communication interface 310, a decryptor 320, a memory 330, and a processor 340.

The communication interface 310 may interface communication between the verification server 300 and the first authentication data collector 100, communication between the verification server 300 and the non-identifying personal data collection devices 200-1 to 200-3, communication between the verification server 300 and the gateway 110, and communication between the verification server 300 and the second authentication data collector 120, and may process data or signals transmitted and received during the interfacing process.

The decryptor 320 may decrypt encrypted primary authentication data collected by the first authentication data collector 100 or encrypted secondary authentication data collected by the second authentication data collector 120. In addition, the decryptor 320 may decrypt encrypted video (or image) data or encrypted non-identifying personal data collected by the plurality of non-identifying personal data collection devices 200-1 to 200-3.

The memory 330 may temporarily or permanently store data required to process the processor 340, data generated during or after the processing of the processor 340, or the like.

The processor 340 may include an authenticator 341, a first verifier 343, a non-identifying personal data extractor 345, a second verifier 347, and a verification level controller 349.

The authenticator 341 may perform the primary authentication operation (S210) using the authentication data collected by the first authentication data collector 100, and the secondary authentication operation (S250) using the authentication data collected by the second authentication data collector 120.

The first verifier 343 may perform the first verification operation (S220). The first verifier 343 may determine whether an abnormal situation occurs in the verification target TGP or the portable terminal 50 through information (location data or motion sensing data of the portable terminal 50, etc.) collected from the portable terminal 50 of the verification target TGP.

For example, when it is determined that the location of the portable terminal 50 stays in one place for a long time and there is no movement or when it is determined that the location of the portable terminal 50 shows an abnormal movement pattern (e.g., abnormally abrupt movements, etc.), it may be determined that an abnormal situation occurs.

According to an embodiment, the abnormal situation may include at least one of a case in which authentication authority granted to the verification target TGP in an initial authentication process (e.g., the primary authentication operation (S210)) has expired, a case in which a situation(e.g., location for time) of the verification target TGP is out of the scope of the granted authentication authority, a case in which a problem occurs in the operation of a portable terminal (e.g., 50) authenticated by the verification target TGP during the initial authentication process (e.g., the primary authentication operation (S210)), and a case in which a portable terminal (e.g., 50) may be used by someone other than the verification target TGP.

According to an embodiment, the first verifier 343 may classify and determine the types of abnormal situations. For example, the types of abnormal situations may be divided into various types such as non-wearing, damage, loss, or theft of the portable terminal 50.

The non-identifying personal data extractor 345 may extract non-identifying personal data from videos (or images) collected by the plurality of non-identifying personal data collection devices 200-1 to 200-3.

According to an embodiment, the non-identifying personal data extractor 345 may extract non-identifying personal data by removing a portion that allows a specific person to be directly identified from a video or image collected by each of the plurality of non-identifying personal data collection devices 200-1 to 200-3 or by processing a special effect (e.g., blur, mosaic processing, etc.) on the portion that allows a specific person to be directly identified.

According to another embodiment, when non-identifying personal data is transmitted to the verification server 300 in the form extracted by each of the plurality of non-identifying personal data collection devices 200-1 to 200-3, the verification server 300 may not include the non-identifying personal data extractor 345.

The second verifier 347 may perform the second verification operation (S240). The second verifier 347 may determine a classification type corresponding to each of a plurality of classification criteria for the non-identifying personal data collected by the non-identifying personal data collection devices 200-1 to 200-3.

Each of the plurality of classification criteria may be a criterion for classifying non-identifying personal data according to a data type of the non-identifying personal data. For example, the classification criteria may be the type of clothes, the color of clothes, the hairstyle, the beard shape, the type of accessories being worn, or whether or not glasses are worn of the verification target TGP.

According to an embodiment, collected non-identifying personal data may include data corresponding to the plurality of classification criteria.

The classification type may be classified into groups having a common attribute among the plurality of classification criteria. For example, within a classification criterion of "type of clothing", long-sleeved/short-sleeved, shirt/t-shirt, one-piece/two-piece, etc. may be configured as classification types according to common attributes. For example, within a classification criterion of "hairstyle", black hair/dyed (by color), long/short hair, parted (left, middle, right), straight hair/curly, etc. may be configured as classification types according to common attributes.

The second verifier 349 may perform verification based on a result of comparing the classification type corresponding to each of the plurality of determined classification criteria with a criterion type.

For example, it may be determined that the verification is successful when a standard type for each of a plurality of classification criteria initially collected by the verification target TGP is a "long-sleeved shirt" in the "type of clothing" classification criterion and "left parted black hair" in the "hairstyle" classification criterion. In addition, it may be determined that the verification is successful when a criterion type for each classification criterion of non-identifying personal data collected by the non-identifying personal data collection device 200-1 to 200-3 is a "long-sleeved shirt" in the "type of clothing" classification criterion and "left parted black hair" in the "hairstyle" classification criterion.

According to an embodiment, the second verifier 349 may apply a weight to each of a plurality of classification criteria, and may perform verification by applying the weight to a result of comparing a classification type for each of the plurality of classification criteria with a criterion type.

For example, it is assumed that a classification criterion has a weight of 4:4:2 for the type of clothing, hairstyle, and type of accessory being worn, and a reference value of a matching rate for determining whether the verification is successful is 0.7. In this case, when a classification type for the type of clothing and hairstyle matches a criterion type, but a classification type for the type of accessory being worn does not match the criterion type, it can be determined that verification is successful because the matching rate is 0.8, exceeding the criterion value of 0.7.

According to an embodiment, the weight may be determined according to the variability of corresponding classification criteria. In this case, a relatively low weight may be set for a classification criterion with a high possibility of variation, and a relatively high weight may be set for a classification criterion with a low possibility of variation.

According to an embodiment, the second verifier 347 may perform verification using methods (e.g., a method of verifying whether behavioral patterns of the verification target TGP matches, a method of verifying a password pattern input by the verification target TGP to the portable terminal 50, etc.) other than the method using the non-identifying personal data of the verification target TGP.

The verification level controller 349 may perform verification level control operation (S245). The verification level controller 349 may check a history of verification or a history of re-authentication of the verification target TGP, and based on the checked verification history or re-authentication history, may set an abnormal suspicious area according to a change in the frequency of access to a partial area within the access permission area of the verification target TGP.

According to an embodiment, the history of verification or the history of re-authentication of the verification target TGP may be stored in the memory 330.

When there is a history of re-authentication performed by the authenticator 341, and when there is a history of verification performed by the first verifier 343 or the second verifier 347, the verification level controller 349 may check a change in the frequency of access to a partial area within the access permission area of the verification target TGP. When the change in the frequency of access to a partial area within the access permission area of the verification target TGP exceeds a reference value, the verification level controller 349 may control a verification level of the first verifier 343. For example, the verification level control may be setting an abnormal suspicious area for a partial area in which a change in access frequency exceeds a reference value.

According to an embodiment, the verification level controller 349 may differentially set a range of the abnormal suspicious area RG-DB1 or RG-DB2 according to the number of verifications or re-authentications.

According to another embodiment, the verification level controller 349 may differentially set a range of the abnormal suspicious area (e.g., RG-DB1 or RG-DB2) according to the type of the abnormal situation.

According to another embodiment, in the verification level control operation (S245), the verification level controller 349 may differentially set a range of the abnormal suspicious area (e.g., RG-DB1 or RG-DB2) according to the severity of the abnormal situation. For example, the severity of the abnormal situation may be preset according to the type of the abnormal situation.

According to another embodiment, the verification level controller 349 may differentially set a range of the abnormal suspicious area (e.g., RG-DB1 or RG-DB2) when the verification is successful and when the verification fails according to the result of the second verification operation (S240).

The first verifier 343 may process the verification in a first verification process performed later according to the verification level controlled by the verification level controller 349. According to an embodiment, the first verifier 343 may determine an abnormal situation by reflecting an abnormal suspicious area set by the verification level controller 349.

Figure 6:
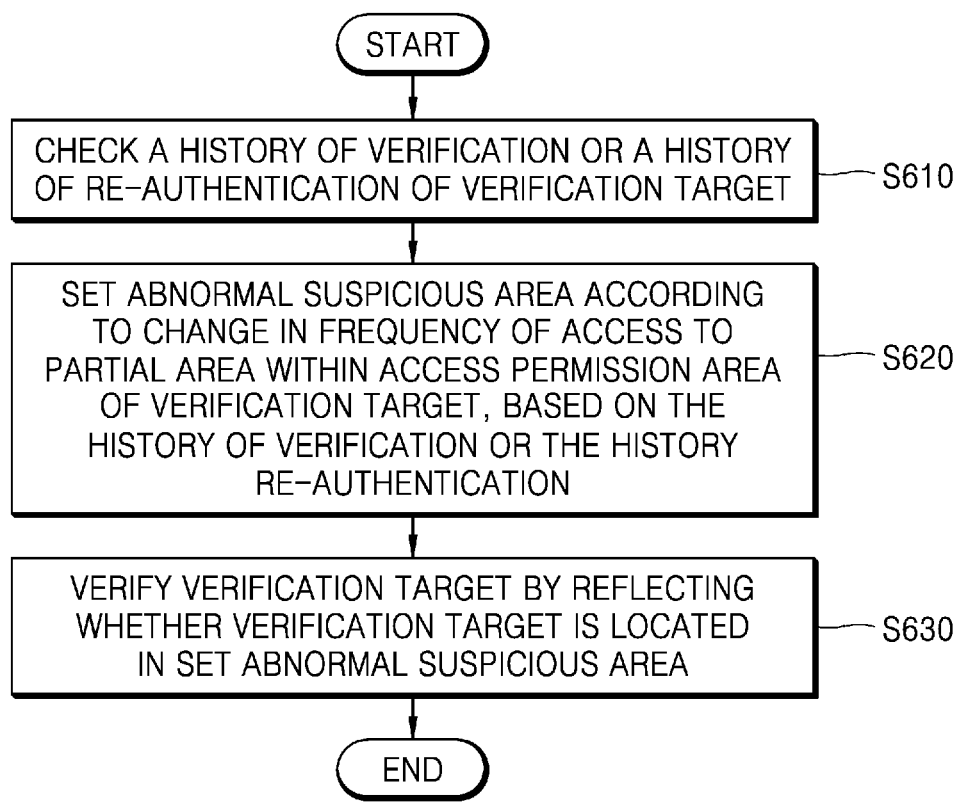
FIG. 6 is a flowchart of a verification level control method according to an embodiment.

FIG. 6 is a flowchart of a verification level control method according to an embodiment.

Referring to FIGS. 1 to 6, in operation S610, the verification level control method according to an embodiment may check a history of verification or a history of re-authentication of the verification target (TGP).

According to an embodiment, the history of verification may include a history such as the number of times an abnormal situation occurs in the first verification operation (S220), the number of times the second verification operation (S240) is performed, or the number of times that a result of verification failure or verification success occurs in the second verification operation (S240).

According to an embodiment, the history of re-authentication may include a history such as the number of re-authentication times in which the primary authentication operation (S210) is performed again after the verification fails in the second verification operation (S240).

In the verification level control method according to an embodiment, in operation S620, based on the history of verification or the history of re-authentication checked in operation S610, an abnormal suspicious area may be set according to a change in the frequency of access to a partial area within the access permission area of the verification target TGP.

According to an embodiment, a range of the abnormal suspicious area may be set differently according to the number of verifications or re-authentications, the type of the abnormal situation, the severity of the abnormal situation, the history of verification or the history of re-authentication (e.g., when the verification is successful and when the verification fails according to the result of the second verification operation (S240)), and the like.

In the verification level control method according to an embodiment, in operation S630, the verification target TGP may be verified by reflecting whether the verification target TGP is located in the abnormal suspicious area set in operation S620.

According to an embodiment, the verification in operation S630 may be the first verification operation (S220).

According to an embodiment, the verification level control method according to an embodiment may be implemented as a program including program code for performing operations S610 to S630 and stored in a medium, and a processor may be combined with the medium to execute the program.

Methods and apparatuses according to an embodiment may detect and verify an abnormal situation more accurately and effectively according to a history of verification or a history of re-authentication of a verification target.

In addition, methods and apparatuses according to an embodiment may perform precise verification on a verification target by additionally setting an abnormal suspicious area even within an access permission area of a verification target.

In addition, methods and apparatuses according to an embodiment may minimize a case in which a verification level is unnecessarily controlled by considering a behavioral pattern of a companion of a verification target.

Hereinabove, the present invention has been described with reference to the preferred embodiments. However, it will be appreciated by one of ordinary skill in the art that various modifications and changes of the present invention can be made without departing from the scope of the inventive concept which are defined in the appended claims and their equivalents.

What is claimed is:

1. A verification level control method comprising:
checking a history of verification or a history of re-authentication of a verification target;
setting an abnormal suspicious area according to a change in frequency of access to a partial area within an access permission area of the verification target, based on the checked verification history or re-authentication history; and
verifying the verification target by reflecting whether the verification target is located in the set abnormal suspicious area,
wherein the abnormal suspicious area is an area where access of the verification target is permitted and verification of the verification target is performed,
wherein a re-authentication of the verification target is performed in an explicit authentication method in which the verification target needs to perform a separate action for the re-authentication.

2. The verification level control method of claim 1, wherein the setting of the abnormal suspicious area comprises:
setting a range of the abnormal suspicious area differently according to the number of verifications or re-authentications, based on the history of verification or the history of re-authentication.

3. The verification level control method of claim 1, wherein the verification comprises:
first verification determining whether an abnormal situation occurs in the verification target; and
second verification performing an additional verification process for the abnormal situation when an abnormal situation occurs according to a result of the first verification.

4. The verification level control method of claim 3, wherein the abnormal situation comprises:
at least one of a case in which authentication authority granted to the verification target in an initial authentication process has expired, a case in which a situation of the verification target is out of the scope of the granted authentication authority, a case in which a problem occurs in an operation of a portable terminal authenticated by the verification target during the initial authentication process, and a case in which the portable terminal is used by someone other than the verification target.

5. The verification level control method of claim 3, wherein the setting of the abnormal suspicious area is performed when the abnormal situation occurs according to a result of the first verification.

6. The verification level control method of claim 5, wherein the setting of the abnormal suspicious area comprises:
setting a range of the abnormal suspicious area differently according to a type of the abnormal situation that occurs according to the result of the first verification.

7. The verification level control method of claim 3, wherein the setting of the abnormal suspicious area comprises:
setting a range of the abnormal suspicious area differently according to severity of the abnormal situation that occurs according to the result of the first verification.

8. The verification level control method of claim 7, wherein the severity of the abnormal situation is preset according to a type of the abnormal situation.

9. The verification level control method of claim 8, wherein a case in which the verification target is located in a non-accessible area and a case in which the verification target is located in the abnormal suspicious area are set as different types of abnormal situations or different severities of abnormal situations.

10. The verification level control method of claim 9, wherein notification is performed within different notification target ranges respectively when the verification target is located in the non-accessible area and when the verification target is located in the abnormal suspicious area.

11. The verification level control method of claim 3, wherein the setting of the abnormal suspicious area comprises:
setting a range of the abnormal suspicious area differentially when the second verification is successful and when the second verification fails, according to a result of the second verification.

12. The verification level control method of claim 1, wherein the setting of the abnormal suspicious area is performed by considering changes in frequency of access to the partial area of the verification target and a companion of the verification target.

13. A verification server comprising:
- a verification level controller configured to check a history of verification or a history of re-authentication of a verification target, and set an abnormal suspicious area according to a change in frequency of access to a partial area within an access permission area of the verification target, based on the checked verification history or re-authentication history; and
- a verifier configured to verify the verification target by reflecting whether the verification target is located in the set abnormal suspicious area,
- wherein the abnormal suspicious area is an area where access of the verification target is permitted and verification of the verification target is performed,
- wherein a re-authentication of the verification target is performed in an explicit authentication method in which the verification target needs to perform a separate action for the re-authentication.

* * * * *